United States Patent
Ishii

(10) Patent No.: US 6,903,860 B2
(45) Date of Patent: Jun. 7, 2005

(54) VACUUM PACKAGED MICROMIRROR ARRAYS AND METHODS OF MANUFACTURING THE SAME

(76) Inventor: Fusao Ishii, 350 Sharon Park Dr., G26, Menlo Park, CA (US) 94025

( * ) Notice: Subject to any disclaimer, the term of this patent is extended or adjusted under 35 U.S.C. 154(b) by 41 days.

(21) Appl. No.: 10/699,143

(22) Filed: Nov. 1, 2003

(65) Prior Publication Data
US 2005/0094242 A1 May 5, 2005

(51) Int. Cl.$^7$ ............................................ G02B 26/00
(52) U.S. Cl. ....................................... 359/290; 359/230
(58) Field of Search ................................ 359/290, 291, 359/214, 224, 230, 231; 438/406, 106; 445/25

(56) References Cited

U.S. PATENT DOCUMENTS

| | | | |
|---|---|---|---|
| 4,592,628 A | 6/1986 | Altman et al. | |
| 4,662,746 A | 5/1987 | Hornbeck | |
| 5,216,537 A | 6/1993 | Hornbeck | |
| 5,583,688 A | 12/1996 | Hornbeck | |
| 5,835,256 A | 11/1998 | Huibers | |
| 5,997,378 A | 12/1999 | Dynka et al. | |
| 6,129,603 A | 10/2000 | Sun et al. | |
| 6,344,672 B2 | 2/2002 | Huffman | |
| 6,407,501 B1 | 6/2002 | Song et al. | |
| 6,479,320 B1 | 11/2002 | Gooch | |
| 6,507,082 B2 | 1/2003 | Thomas | |
| 6,537,892 B2 | 3/2003 | Jordan et al. | |
| 6,538,800 B2 | 3/2003 | Huibers | |
| 6,583,079 B1 | 6/2003 | Jimura et al. | |
| 2003/0134449 A1 | 7/2003 | Huibers | |

*Primary Examiner*—Scott J. Sugarman
*Assistant Examiner*—Richard Hanig

(57) ABSTRACT

A vacuum packaged electromechanical micromirror array comprises a 1st packaging substrate, a 2nd packaging substrate, a device substrate with a 1st surface and a 2nd surface, control circuitry on said 1st surface, and micromirrors on said 2nd surface. The device substrate resides on the 1st packaging substrate with electrical connections between them. The electromechanical micromirror array is sealed in a vacuum package formed by the packaging substrates. The vacuum packaged micromirror array may be used as a spatial light modulator (SLM). Methods of fabricating the vacuum packaged array are disclosed. Such methods generally involve providing a device substrate with a 1st surface and a 2nd surface, fabricating control circuitry on the 1st surface, fabricating micromirrors on the 2nd surface, providing a 1st packaging substrate, mounting the device substrate on the 1st packaging substrate by flip-chip assembly, providing a 2nd packaging substrate, and sealing the packaging substrates by glass frit sealing.

69 Claims, 16 Drawing Sheets

VACUUM PACKAGED MICROMIRROR ARRAYS AND METHODS OF MANUFACTURING THE SAME

TECHNICAL FIELD

This invention relates to packaged micromirror arrays and methods of manufacturing the same. Such arrays have applications in spatial light modulators.

BACKGROUND ART

Electromechanical micromirror devices have drawn considerable interest because of their application as spatial light modulators (SLMs). A spatial light modulator requires an array of a relatively large number of such micromirror devices. In general, the number of devices required ranges from 60,000 to several million for each SLM. Despite significant advances that have been made in recent years, there is still a need for improvement in the performance and manufacturing yields of electromechanical micromirror devices.

An example of an early generation prior art device is disclosed in U.S. Pat. No. 4,592,628. U.S. Pat. No. 4,592,628 describes an array of light reflecting devices on a substrate. Each device comprises a hollow post and a deflectable polygonal mirror attached thereto. Each mirror acts as a deflectable cantilever beam. The mirrors are deflected by a beam of electrons from a cathode ray tube. FIG. 4 of U.S. Pat. No. 4,592,628 shows the micromirror device enclosed in the evacuated interior of a cathode ray tube.

A 1st generation Texas Instruments, Inc. (TI) device is described in U.S. Pat. No. 4,662,746. A micromirror is suspended by 1 or 2 hinges. If suspended by 1 hinge, the micromirror deflects like a cantilever beam. If suspended by 2 hinges, the micromirror deflects like a torsion beam. Addressing electrodes are located below the micromirrors and addressing circuits are located at the same level in the substrate as the addressing electrodes.

2nd generation TI device is described in U.S. Pat. No. 5,583,688. A 2nd generation TI device is one in which the torsion hinge is at a different level than the reflective mirror. As described more fully in U.S. Pat. No. 5,583,688, the mirror is supported by a mirror support post, which is attached to the torsion hinge by a yoke. In U.S. Pat. No. 5,583,688, the mirrors are actuated by electrostatic forces between the mirror and address electrodes. The device is designed such that the mirror edge do not touch the address electrodes. Instead, the yoke edge touches the yoke landing site. The fill factor is relatively high because the CMOS circuits and torsion hinges are hidden under the mirror. Metallic pads are placed along at least one peripheral edge of the array for making electrical connections. In the conventional art, the electrical connections are made by wire bonding.

Micromirrors that are described in U.S. Pat. No. 4,662,746 and U.S. Pat. No. 5,583,688 are fabricated on top of CMOS circuits. There may be manufacturing problems associated with the fabrication of micromirrors on top of CMOS circuits. This issue is discussed in U.S. Pat. No. 5,216,537. In this patent, it is discussed that the surface of the CMOS chip has certain manufacturing artifacts, namely aluminum hillocks, pinholes, nonplanar surfaces, and steep sidewalls in the protective oxide at edges of aluminum leads. In response to these problems, U.S. Pat. No. 5,216,537 discloses an improved architecture in which an air gap is provided between the top surface of the CMOS chip and the mirror addressing electrodes. A further advantage of this approach is that because of the low dielectric constant of air, parasitic coupling between the CMOS and the micromirror is reduced.

The placement of CMOS circuits directly under the micromirrors is also responsible for problems of photosensitivity. As discussed in U.S. Pat. No. 6,344,672, it was found that the CMOS memory cells are unstable in a high-intensity light environment. The patent provided an active collector region in which photogenerated carriers could recombine before reaching the addressing electrode.

Reflectivity, Inc. (Sunnyvale, Calif.) is also known to be developing micromirror devices. As disclosed in U.S. Pat. No. 5,835,256, the aforementioned problems associated with placing CMOS and micromirrors on the same substrate are solved by placing the micromirrors and CMOS on different substrates. In other words, a hinge and a micromirror are fabricated on an optically transparent substrate, such that the optically reflective surface of the micromirror is proximate the optically transparent substrate. Addressing circuits including mirror addressing electrodes are fabricated on a 2nd substrate (typically silicon) and the 2 substrates are bonded together with a predetermined gap between the micromirror and the addressing electrodes.

However, a difficulty with the architecture of U.S. Pat. No. 5,835,256 is that the gap between the mirror and mirror addressing electrodes is difficult to control. Since the actuation force is superlinearly dependent on this gap, it is imperative to achieve uniform gap over the entire array to obtain uniform performance characteristics. As discussed in US 2003/0134449 A1, 2nd and higher order adjustments in the gap may be needed in the manufacturing process. Such adjustments make the manufacturing process more complicated. It would be preferable to have a device architecture in which the mirror address electrodes and mirrors are disposed on the same substrate.

U.S. Pat. No. 6,538,800 discusses the use of amorphous silicon as a sacrificial layer in fabricating a micromirror device. It is shown that amorphous silicon can be deposited for this purpose by LPCVD in a quartz tube of a Tylan furnace. It is also shown that a xenon difluoride etch process can be used to etch amorphous silicon with a selectivity of 100 to 1. Therefore, amorphous silicon can be used successfully as a sacrificial layer in addition to photoresists, silicon oxide, silicon nitride, and silicon oxynitride.

In many cases, there is a need to encapsulate MEMS devices in a vacuum. There is the example of aforementioned U.S. Pat. No. 4,592,628 in which the micromirror device is encapsulated in the vacuum of a cathode ray tube. U.S. Pat. No. 6,479,320 describes the vacuum packaging of MEMS devices such as infrared bolometers, gyros, and accelerometers. Instead of packaging individual chips, the entire wafer is packaged simultaneously. This is accomplished by the following steps:

1) Fabricate MEMS devices on a device wafer
2) Form sealing rings at the periphery of each die on the device wafer, where the sealing ring comprises a layer of silicon nitride (for electrically isolating the underlying electrical leads) followed by a solder comprising a 1st layer of titanium, a 2nd layer of palladium, and a 3rd layer of gold.
3) Similarly form sealing rings on the lid wafer.
4) The lid wafer and device wafer are aligned to each other and evacuated.
5) The wafers are heat treated to form a seal.

Note that U.S. Pat. No. 6,479,320 describes the vacuum sealing of a device wafer to a lid wafer, where the MEMS devices are disposed on the device wafer.

A preferred sealing method is glass frit sealing because it forms a leak-free seal over non-planar surfaces. Glass frit compositions are well known in the art. Generally a glass frit composition comprises a glass powder, a solvent, a binder, and optionally other additives. Suitable glass powders include PbO, $B_2O_3$, silica ($SiO_2$), alumina ($Al_2O_3$), and others. Acrylics may be used as binders. In a conventional method of sealing 2 substrates, glass frit compositions are coated at the desired bond line on one or both substrates. Methods for coating the glass frit composition include deposition from a nozzle dispenser, screen printing, tape casting, molding, and extrusion. The formulation of the glass frit composition is at least partially dependent upon the desired width and thickness of the bond line.

U.S. Pat. No. 6,583,079 describes glass frit compositions that can be sealed at relatively low temperatures of 410 to 430° C. with relatively short curing times of 5 to 20 minutes. Glass powders according to U.S. Pat. No. 6,583,079 have glass transition temperatures ranging from 296 to 321° C., and softening temperatures ranging from 338 to 398 ° C. The glass powders essentially consist of 75–90% PbO, 7–20% $B_2O_3$, 0–8% ZnO, 0–5% $SiO_2$, and 0.1–8% $Al_2O_3+Fe_2O_3$.

U.S. Pat. No. 6,537,892 discloses a glass frit sealing process for MEMS devices such as accelerometers, sensors, and actuators. The process relates to the formation of a seal between a device wafer containing MEMS devices and a lid wafer. Preferred methods of curing the glass frit composition are described. There are 2 important features to this invention. Firstly, the glass frit composition contains a particular filler material that establishes a stand-off distance between the 2 wafers, where the filler material has a higher melting point than the glass frit. Secondly, the wafers are provided with recessed areas adjacent bond areas for accommodating excess glass frit material. The 2nd innovation is useful for limiting the width of the bonding line. Limiting the width of the bonding line is important when the bonding line is being formed on a high cost, device quality wafer.

Typically, an exhaust tube is placed at the periphery of the substrate so that it crosses the bonding line. Initially, there is a 1st heat treatment to remove the solvent and binder. The temperature of the 1st heat treatment may be in the range of about 100° C., to 300° C., i.e. temperatures that are sufficient to vaporize the binder and solvent but do not melt the glass powder. The substrates are aligned and are heated to melt the glass frit to form a seal around the bonding line and the exhaust pipe. The assembly is evacuated through the exhaust pipe, and when the evacuation is complete, the exhaust pipe is sealed. In an alternative method, an evacuation pipe is sealed to the outer surface of the rear substrate using frit glass. Such a method is described, for example, in U.S. Pat. No. 6,407,501, which describes a sealing method for a plasma display panel (PDP).

Sealing methods that do not use exhaust pipes have also been disclosed. The elimination of the exhaust pipe reduces manufacturing steps and makes more efficient use of the available space for the electronic device. U.S. Pat. No. 6,129,603 discloses a sealing method for a field emission display using a low temperature glass frit. A glass frit with a glass transition temperature of 200 to 250° C. is formed by mixing 2% to 4% Q-Pac organic compound with NEG (Nippon Electric Glass) low temperature glass. The glass frit composition is deposited along the bonding line on one substrate and the 2 substrates are assembled. The assembly is evacuated in a vacuum oven and then heated to <300° C. to melt the glass frit and form a seal.

Another sealing method for field emission displays without using exhaust pipes is disclosed by U.S. Pat. No. 5,997,378. The preferred glass frit is LS-1014 from Nippon Electric Glass. In this method, a glass frit composition is deposited along the bonding line. In addition, compressible protrusions of glass frit are also deposited along the bonding line. In a preferred embodiment, the compressible protrusions are about 250 microns tall and are located at 25 mm intervals. The space between the compressible protrusions act as high conductance exhaust channels during the evacuation step. After the evacuation step, the glass frit is melted in a high temperature step and the seal is formed. The evacuated chamber also includes 2 strip of getter material (ST-707 getter strip from SAES), located along the edge of the display. Metallic particles deposited on the metal foil become reactive when heated. The getter functions to decrease the pressure within the sealed space throughout the lifetime of the display. It was found that the getter was activated above 375° C.

It is known that micromirrors are sensitive to dust, particles, gases, moisture, and other environmental factors. Conventionally, electrical connections to micromirror arrays are made by wire bonding. In prior art devices where the micromirror and addressing circuitry are on the same substrate (e.g. U.S. Pat. No. 4,662,746 and U.S. Pat. No. 5,583,688), it would be desirable to form a protective layer on the micromirror array while wire bonds are formed at the periphery of the die. However, since it is not possible to remove the protective layer after the wire bonding, wire bonding must be carried out with neighboring micromirrors unprotected.

In micromirror devices where the CMOS and micromirrors are on separate substrates (e.g. U.S. Pat. No. 5,835,256), the micromirrors may be protected by sealing the 2 substrates before performing the wire bond. However, as discussed above, there are other manufacturing problems that arise from placing the CMOS circuitry and micromirrors on separate substrates.

U.S. Pat. No. 6,507,082 provides a flip-chip assembly method for devices in which the CMOS circuitry and micromirrors are on the same side of the same substrate. Furthermore, the micromirrors are protected in a protective layer during the flip-chip assembly. In summary, the method outlined in U.S. Pat. No. 6,507,082 is as follows:

1) Form micromirror arrays and addressing circuits on a substrate;
2) Form a protective layer on the substrate and pattern it such that the micromirror arrays are protected and metallic pads are exposed;
3) Deposit solder balls on the metallic pads;
4) Singulate the chips;
5) Flip-chip assemble a chip into the opening of a ceramic substrate;
6) Underfill the gaps between the solder joints with a polymeric encapsulant;
7) Remove the protective layer from the micromirror array; and
8) Attach a lid to the substrate for sealing the package.

This method is an improvement in that flip-chip assembly is used and the micromirror array is protected during assembly. However, a limitation is that although the package is sealed, it is not under vacuum. It should be noted that the interface region between the chip and the package contains both the polymeric encapsulant and the solder ball array. This interface is not intended to maintain a vacuum, and it is not the intention of the patent to provide a vacuum interior.

SUMMARY OF THE INVENTION

The present invention provides vacuum packaged micromirror arrays and methods of manufacturing them that overcome some of the limitations of the prior art. According to the present invention, a vacuum packaged electromechanical micromirror array comprises a 1st packaging substrate, a 2nd packaging substrate, a device substrate with a 1st surface and a 2nd surface, control circuitry disposed on said 1st surface, and a plurality of micromirrors disposed on said 2nd surface. The vacuum packaged arrays may be 1-dimensional (linear) or 2-dimensional and may be used as a spatial light modulators (SLMs). The device substrate resides on the 1st packaging substrate with electrical connections between them. The micromirror array is sealed in a vacuum packaged formed by the packaging substrates. According to the present invention, methods of fabricating vacuum packaged micromirror arrays generally involve providing a device substrate with a 1st surface and a 2nd surface, fabricating control circuitry on the 1st surface, fabricating micromirrors on the 2nd surface, providing a 1st packaging substrate, mounting the device substrate on the 1st packaging substrate by flip-chip assembly, providing a 2nd packaging substrate, and sealing the packaging substrate by glass frit sealing. In a preferred embodiment, control circuits are fabricated using CMOS technology. In another preferred embodiment, the control circuits on the 1st surface are protected by a protective layer during the fabrication of micromirrors on the 2nd surface. In yet another preferred embodiment, the device substrate is a siliconon-on-insulator (SOI) substrate. In yet another preferred embodiment, the 1st packaging substrate is an insulating substrate such as ceramic or glass, and the 2nd packaging substrate is transparent to electromagnetic radiation.

A 1st advantage of the present invention is that it provides improved dielectric isolation between the control circuit and the micromirror. A 2nd advantage of the present invention is that provides improved optical isolation of the control circuit area. This is particularly advantageous when the micromirror array is used as a spatial light modulator (SLM) and the 1st surface (the micromirror side) is exposed to high intensity radiation. A 3rd advantage of the present invention is that it provides improved manufacturing yields because the control circuit manufacturing processes and micromirror manufacturing processes can be substantially isolated from each other. In other words, manufacturing artifacts arising from the control circuit process will not damage the micromirror because the micromirror is not built on top of the control circuit. A 4th advantage of the present invention is that the micromirror array is provided in a vacuum package with electrical connections formed by flip-chip assembly. As a result, there is a concomitant improvement in manufacturing yield and reliability and performance of the array during its lifetime. These and other advantages of the present invention will become apparent from the detailed description and the claims below.

DETAILED DESCRIPTION OF THE INVENTION

Figure 1:
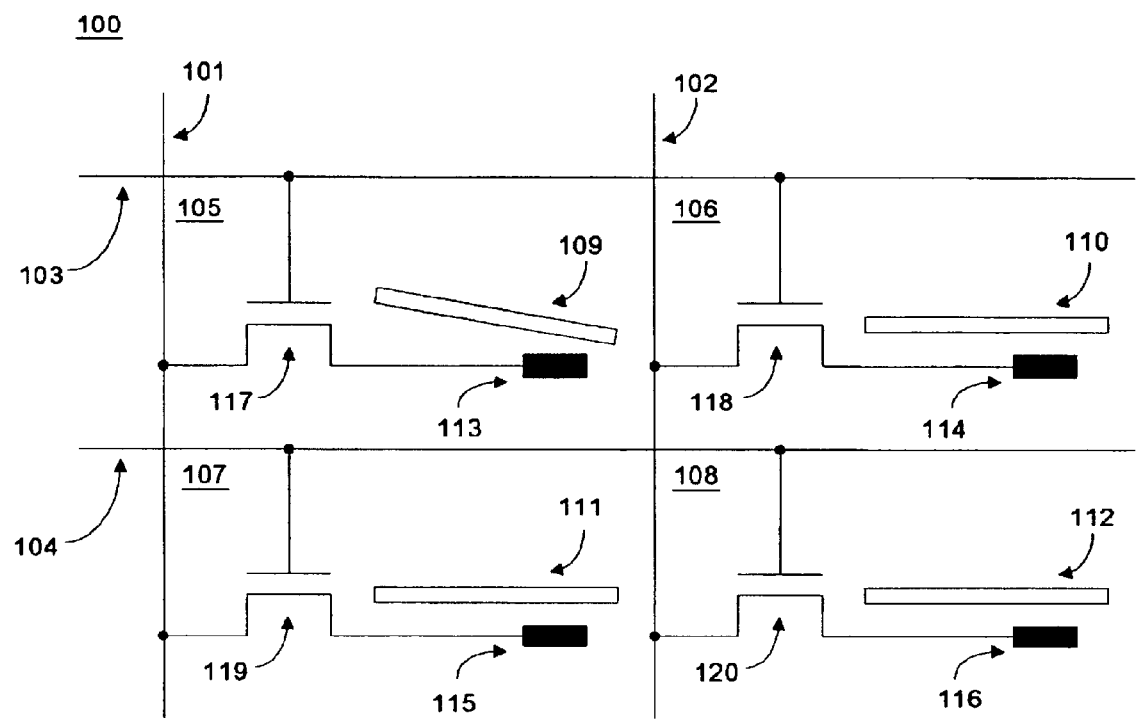
FIG. 1 is a schematic diagram of a 4-pixel array of micromirror devices, comprising control circuits, addressing electrodes, and micromirrors.

The present invention relates to electromechanical micromirror devices and arrays of such devices. Shown schematically in FIG. 1 is an array 100 comprising vertical data lines (101 and 102) and horizontal addressing lines (103 and 104), with each intersection of these data and addressing lines forming an electromechanical micromirror device (105, 106, 107, and 108). Each micromirror device comprises a micromirror (109, 110, 111, and 112), an addressing electrode (113, 114, 115, and 116), and an NMOS transistor (117, 118, 119, and 120). Micromirror 109 is shown to be in a deflected state while the other micromirrors are in their undeflected states. A possible scheme for addressing the micromirrors is as follows: The micromirrors (109, 110, 111, and 112) are electrically connected to ground. The deflection of a micromirror is determined by the bias voltage between the micromirror and its addressing electrode. The desired bias voltage is set by the voltages on the vertical data lines (101 and 102). The NMOS transistors are turned on by sending a low-high-low pulse on the addressing lines (103 and 104), which results in the bias voltages being stored between the micromirrors and addressing electrodes.

While array 100 (FIG. 1) has been shown to consist of 4 micromirror devices, an array may typically consist of greater than 60,000 micromirror devices and may be used as a spatial light modulator (SLM). Furthermore, while FIG. 1 shows a plurality of micromirror devices disposed in a 2-dimensional array, 1-dimensional (linear) array are also possible.

The circuitry as shown in FIG. 1 comprises the following:
1) micromirrors;
2) micromirror addressing electrodes; and
3) control circuitry.

In the particular case of FIG. 1, control circuitry consists of the vertical data lines (101 and 102), horizontal addressing lines (103 and 104), NMOS transistors (117, 118, 119, and 120), and electrical connections among them. In general, control circuitry is understood to mean any circuitry that is provided to control the application of bias voltages between a micromirror and its addressing electrode. As shown in FIG. 1, the control circuitry comprised NMOS transistors. However, it should be understood that the control circuitry could comprise other types of circuits, including CMOS circuits, PMOS circuits, bipolar transistor circuits, BICMOS circuits, DMOS circuits, HEMT circuits, amorphous silicon thin film transistor circuits, polysilicon thin film transistor circuits, SiGe transistor circuits, SiC transistor circuits, GaN transistor circuits, GaAs transistor circuits, InP transistor circuits, CdSe transistor circuits, organic transistor circuits, and conjugated polymer transistor circuits.

Figure 2:
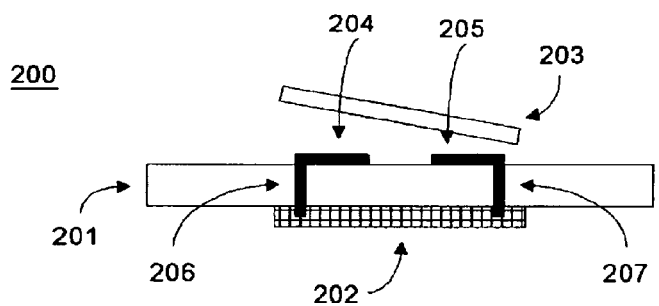
FIG. 2 is a schematic cross sectional view of a micromirror device in accordance with the present invention.

Some of the important concepts of the present invention are illustrated schematically in FIG. 2. A device substrate 201 has a bottom surface on which control circuitry 202 is fabricated. Micromirror 203 and addressing electrodes 204 and 205 are fabricated on the top surface of substrate 201. For simplicity, support structures for supporting micromirror 203 are not shown. Electrical connections between the addressing electrodes (203 and 204) and control circuitry 202 are provided by electrical routing lines 206 and 207. The electrical routing lines 206 and 207 may be in the form of vias in the device substrate 201 with metallization in these vias. The device substrate may be selected from among the following: silicon-on-insulator (SOI), silicon, polycrystalline silicon, glass, plastic, ceramic, germanium, SiGe, SiC, sapphire, quartz, GaAs, and InP. In general, the choice of device substrate should be consistent with the choice of control circuit technology. For example, a silicon-on-insulator substrate may be suitable for CMOS circuits, and a glass substrate may be suitable for amorphous silicon thin film transistor circuits.

Figure 3A:
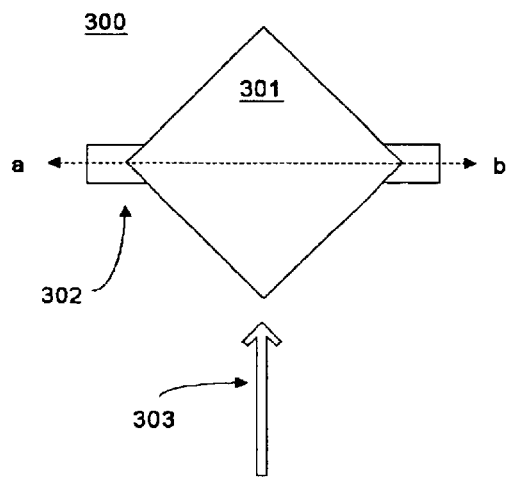
FIG. 3A is a schematic plan view of a micromirror device in accordance with a 1st embodiment of the present invention.
Figure 3B:
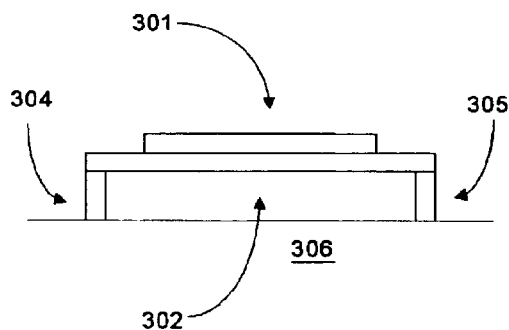
FIG. 3B is a schematic cross sectional view along line a-b of FIG. 3A.

As discussed with reference to FIG. 1, a micromirror device comprises a control circuitry, a micromirror, and addressing electrodes. FIG. 3A is a schematic plan view of a portion of a micromirror device 300 in accordance with a 1st embodiment of the present invention. Micromirror 301 is shown with its reflective side facing towards the reader. The reflective side of micromirror 301 is substantially planar, with neither recessions nor protrusions. Micromirror 301 is supported by a torsion hinge 302. In the case that micromirror portion 300 is disposed in an array for a spatial light modulator (SLM), arrow 303 indicates the projection of the incident light propagation direction on the device substrate plane. Note that micromirror 301 has 4 edges and no edge is perpendicular to arrow 303. FIG. 3B is a schematic cross sectional view along line a-b through torsion hinge 302. Micromirror 301 and torsion hinge 302 are supported by support structures 304 and 305, which are disposed on device substrate 306. Since the micromirror deflects by torsion, the axis of rotation of the micromirror is approximately perpendicular to arrow 303.

Figure 4A:
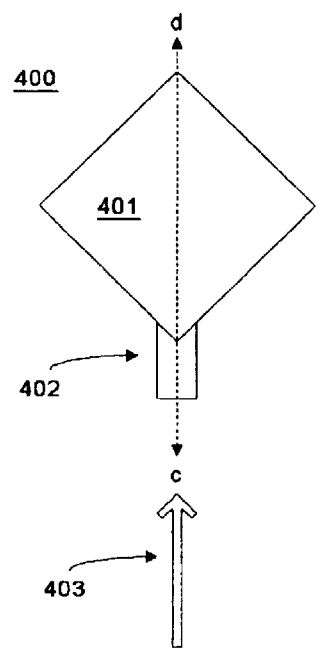
FIG. 4A is a schematic plan view of a micromirror device in accordance with a 2nd embodiment of the present invention.
Figure 4B:
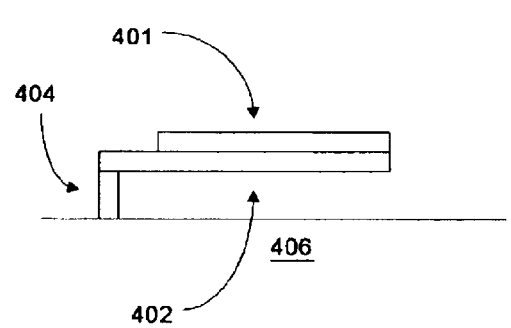
FIG. 4B is a schematic cross sectional view along line c-d of FIG. 4A

FIG. 4A is a schematic plan view of a portion of a micromirror device 400 in accordance with a 2nd embodiment of the present invention. Micromirror 401 is shown with its reflective side facing towards the reader. The reflective side of micromirror 401 is substantially planar, with neither recessions nor protrusions. Micromirror 401 is supported by a beam 402. In the case that micromirror device 400 is disposed in an array for a spatial light modulator (SLM), arrow 403 indicates the projection of the incident light propagation direction on the device substrate plane. Note that micromirror 401 has 4 edges and no edge is perpendicular to arrow 403. FIG. 4B is a schematic cross sectional view along line c-d through beam 402. Beam 402 is supported by support structure 404, which is disposed on device substrate 406. In contrast to micromirror 301 (FIGS. 3A and 3B), the axis of rotation of micromirror 401 is approximately parallel to arrow 403.

Figure 5A:
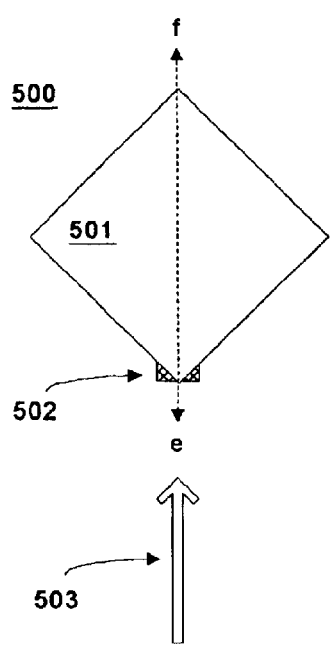
FIG. 5A is a schematic plan view of a micromirror device in accordance with a 3rd embodiment of the present invention.
Figure 5B:
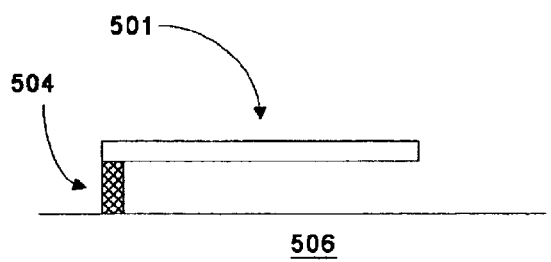
FIG. 5B is a schematic cross sectional view along line e-f of FIG. 5A.

FIG. 5A is a schematic plan view of a portion of a micromirror device 500 in accordance with a 3rd embodiment of the present invention. Micromirror 501 is shown with its reflective side facing towards the reader. The reflective side of micromirror 501 is substantially planar, with neither recessions nor protrusions. In the case that micromirror device 500 is disposed in an array for a spatial light modulator (SLM), arrow 503 indicates the projection of the incident light propagation direction on the device substrate plane. FIG. 5B is a schematic cross sectional view along line e-f. Micromirror 501 is supported by a support structure 504, which is disposed on device substrate 506. The axis of rotation of micromirror 501 is approximately parallel to arrow 503.

An important difference between between micromirror device 400 (FIGS. 4A and 4B) and micromirror device 500 (FIGS. 5A and 5B) is that in device 400, there is a beam 402 which supports the micromirror 401 on the support structure 404, whereas in device 500, the micromirror is positioned directly on support structure 504. Therefore, in FIG. 5A, the top side 502 of support structure 504 is visible in the plan view.

Figure 6A:
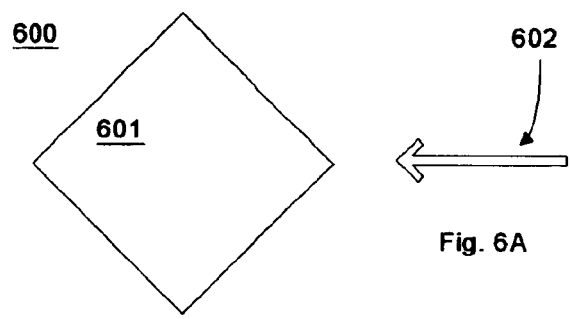
FIGS. 6A through 6D are schematic plan views of a micromirror device according to a 4th embodiment of the present invention, at varying levels of elevation.

FIGS. 6A through 6D are schematic plan views of a micromirror device 600 according to a 4th embodiment of the present invention, at varying levels of elevation. FIG. 6A shows the reflective side (top side) of a micromirror 601. In the case that micromirror device 600 is disposed in an array for a spatial light modulator (SLM), arrow 602 indicates the projection of the incident light propagation vector on the device substrate plane. Arrow 602 is not perpendicular to any of the 4 sides of micromirror 601. Arrow 602 is shown to be approximately 45 degrees from the leading edges of micromirror 601. The reflective side of micromirror 601 is is substantially flat, with neither recesses nor protrusions. As a result, there are no diffraction effects that would be caused by recesses or protrusions in the micromirror.

Figure 6B:
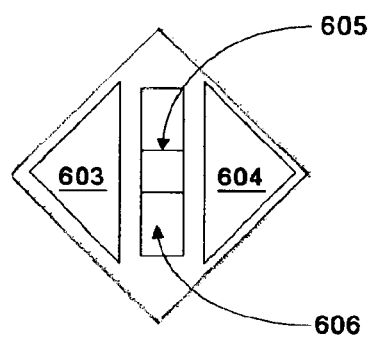
Figure 6C:
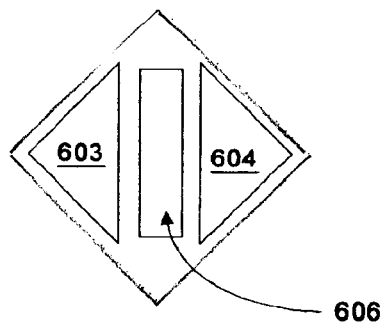

FIG. 6B shows a plan view that is analogous to FIG. 6A except that micromirror 601 has been removed. Addressing electrodes 603 and 604, micromirror support structure 605, and torsion hinge 606 are visible. Torsion hinge 606 supports micromirror support structure 605. Addressing electrodes 603 and 604 are electrically connected to control circuitry which is not shown. Micromirror 601 is actuated by electrostatic forces between it and one or both of the addressing electrodes 603 and 604. FIG. 6C shows the result of removing the mirror support structure 605.

Figure 6D:
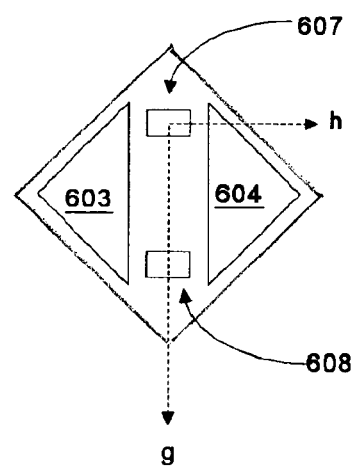

FIG. 6D shows the result of removing torsion hinge 606. Torsion hinge support structures 607 and 608 are shown. FIGS. 7A through 7D and 8A through 8M show a fabrication sequence of a micromirror device using a cross sectional view along the line g-h. In many cases, the micromirror device would be fabricated in an array for use as a spatial light modulator. Therefore, although FIGS. 7A through 7D and 8A through 8M illustrate the fabrication of a single micromirror device, it should be understood that the teachings can be extended to the fabrication of an array of micromirror devices.

Figure 7A:
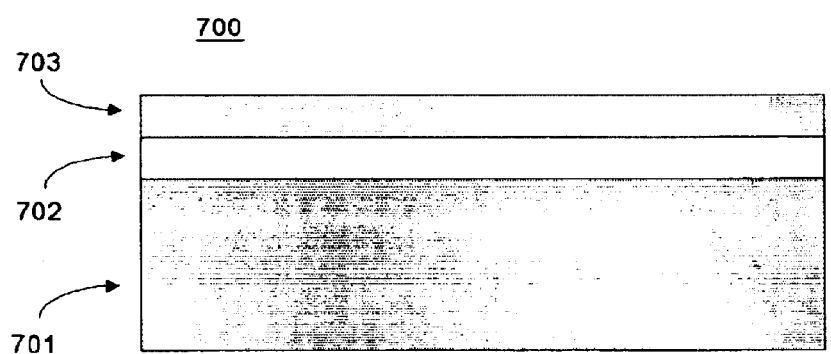
FIGS. 7A through 7D are cross sectional views illustrating the fabrication steps on a 1st device substrate surface, in accordance with a 4th embodiment of the present invention.

FIGS. 7A through 7D illustrate a fabrication sequence on the control circuitry side. FIG. 7A shows a silicon-on-insulator (SOI) substrate 700 comprising an epitaxial top silicon layer 703 with a thickness typically ranging from 50 nm to 600 nm, an intermediate insulator layer 702 with a thickness typically ranging from 50 nm to 2 µm, and a bottom silicon layer 701 with a thickness of around 775 µm. One of the advantages of SOI over silicon substrates is the improved dielectric isolation. In the case of the present invention, the SOI substrate is used to improve the dielectric isolation of the control circuitry and micromirror portion.

Figure 7B:
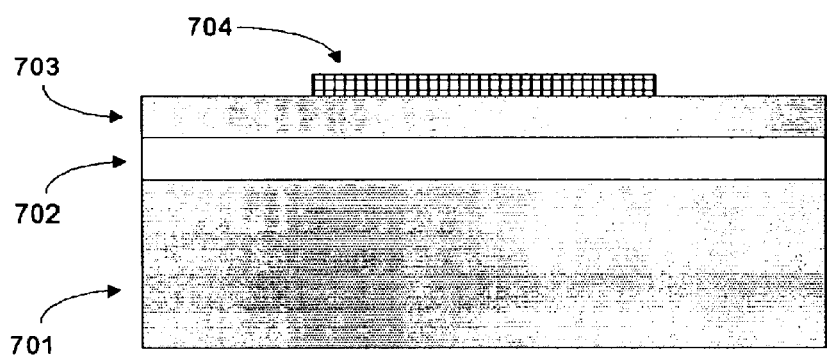

FIG. 7B shows the formation of control circuitry 704 on epitaxial layer 703 of the SOI substrate 700. In general, any integrated circuit technology can be considered for fabricating the control circuitry. For example, CMOS circuitry may be used. However, for applications requiring high frequency or high voltages, BiCMOS or DMOS circuitry may be used.

Figure 7C:
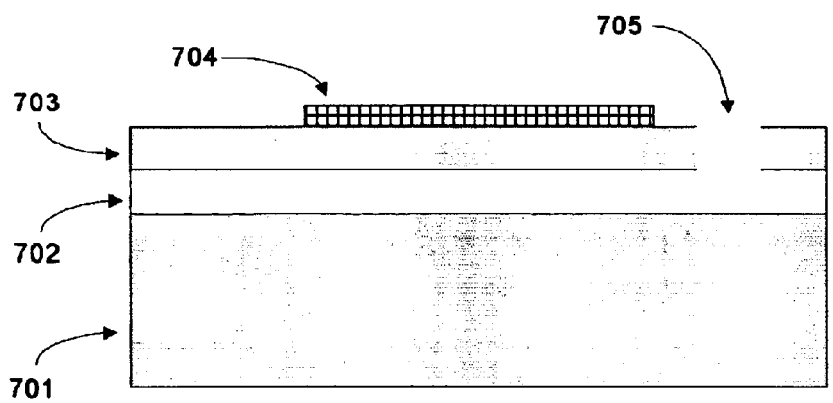
Figure 7D:
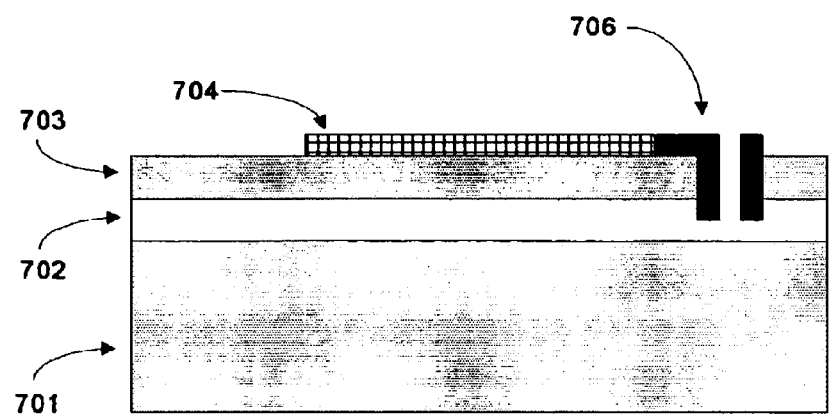

FIG. 7C shows the step of forming a trench 705 through the top epitaxial silicon layer 703 and insulator layer 702, using standard patterning and an anisotropic etch. The anisotropic etch is stopped before the trench 705 reaches the bottom silicon layer 701. This is followed by a metal deposition and patterning step (FIG. 7D) which forms an electrical connection 706 between the control circuitry and the trench. It should be understood that this metal could be any metal that is used in semiconductor fabrication, such as Al alloy, and methods of metal deposition include sputtering, thermal evaporation, and CVD.

At this point the process steps on the control circuitry side are complete. It may be preferable to form a protective layer on the control circuitry side. FIGS. 8A through 8M illustrate a fabrication sequence on the micromirror side. The control circuitry side is mounted on a carrier to securely hold the substrate for the subsequent step (FIG. 8A) of backgrinding and chemical mechanical polishing (CMP) of the back silicon layer 701 to expose the intermediate insulator layer 702.

Figure 8A:
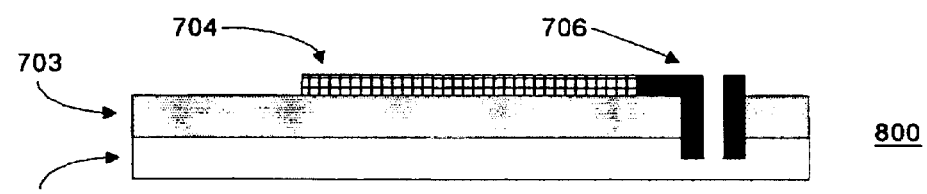
FIGS. 8A through 8M are cross sectional views illustrating the fabrication steps on a 2nd device substrate surface, in accordance with a 4th embodiment of the present invention.
Figure 8B:
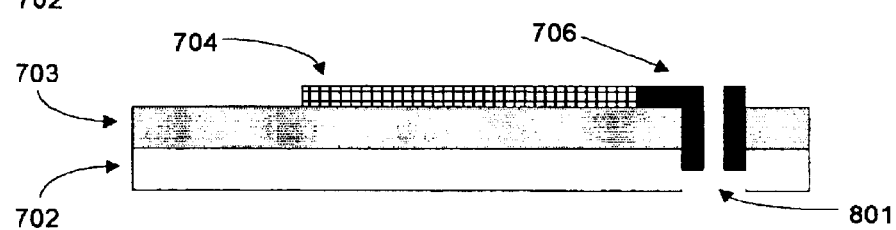
Figure 8C:
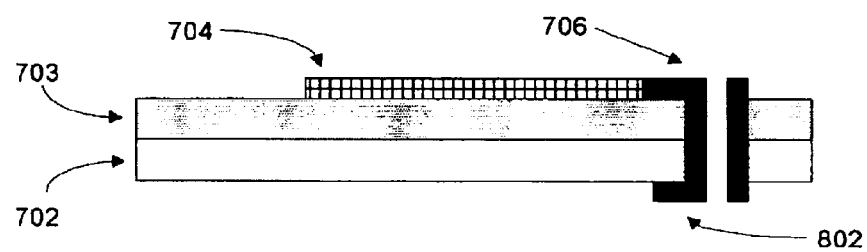

As shown in FIG. 8B, insulator layer 702 is pattered to form a trench 801, thereby completing the via that had been started in the step of FIG. 7C. Another metallization (deposition and patterning) step (FIG. 8C) forms addressing electrodes 802 that are electrically connected, through via 801, to control circuitry 704.

Figure 8D:
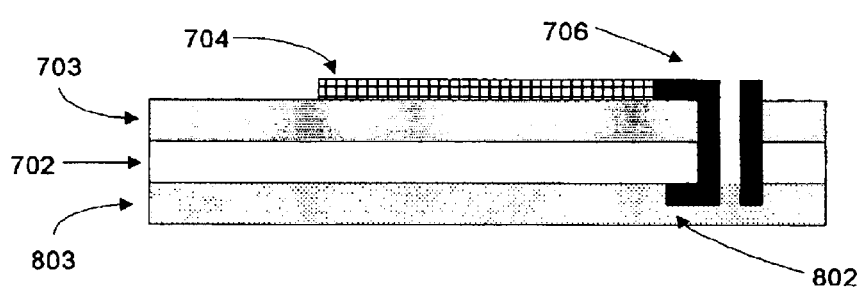
Figure 8E:
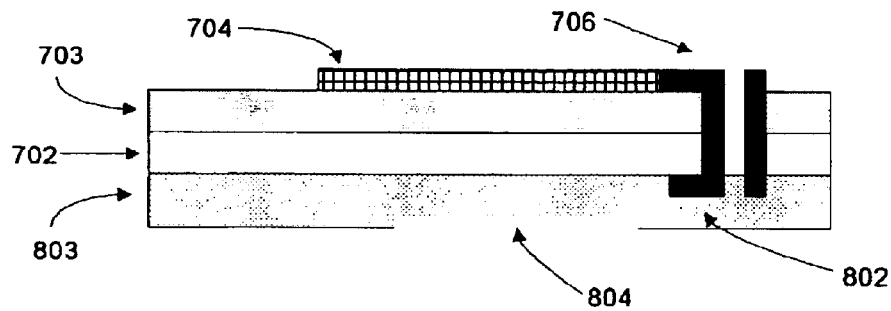
Figure 8F:
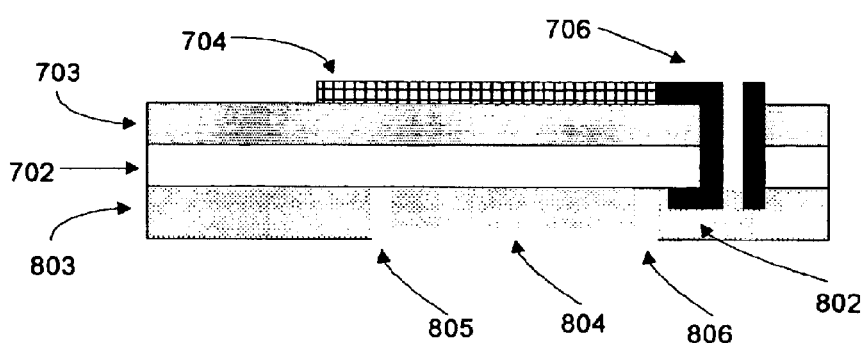

After the formation of the addressing electrodes 802, the torsion hinge and its support structures are formed. An embodiment of this process is illustrated in FIGS. 8D through 8H. An amorphous silicon sacrificial layer 803 is deposited by LPCVD (FIG. 8D). Other suitable methods of depositing amorphous silicon are PECVD, catalytic CVD (also known as hot wire CVD), and sputtering. As discussed in the Background Art section, xenon difluoride can be used to etch amorphous silicon with a selectivity of 100 to 1. Other possible sacrificial layers are photoresists, silicon oxide, silicon nitride, and silicon oxynitride. As shown in FIG. 8E, a photolithographic patterning and anisotropic etching step is carried out to form a recess 804 where the torsion hinge will be formed. Then, another photolithographic patterning and anisotropic etching step (FIG. 8F) is carried out to form holes 805 and 806 where the torsion hinge support structures will be formed. The holes 805 and 806 for the torsion hinge support structures reach the intermediate insulator layer.

Figure 8G:
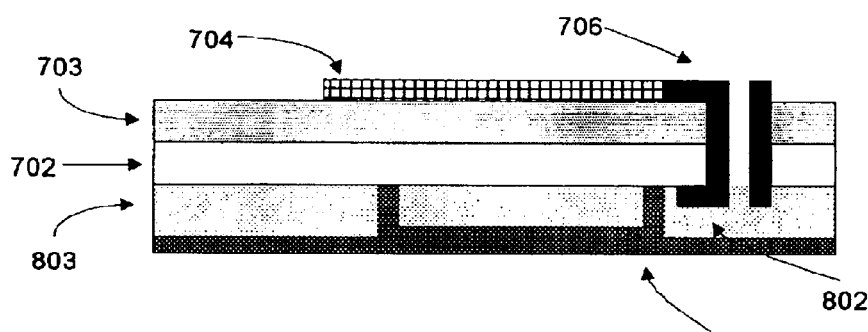
Figure 8H:
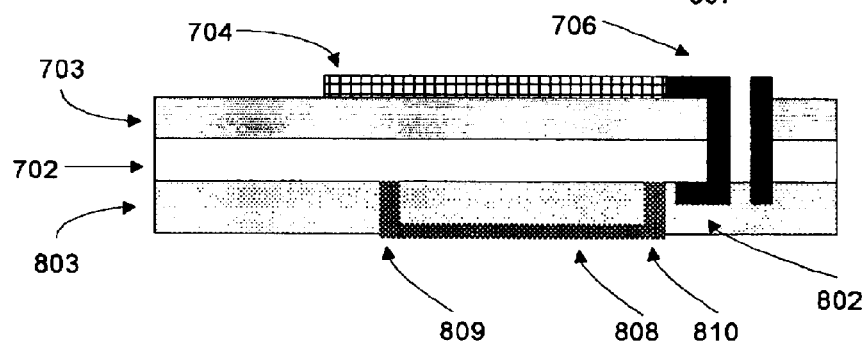

As shown in FIG. 8G, a layer 807 of structural material is deposited. For example, the structural material may be an Al alloy comprising 0.2% Ti, 1% Si, and the remainder Al. A preferred method of depositing this Al alloy is sputter deposition. A metal is chosen for the structural material because the micromirror is typically held at ground potential. As shown in FIG. 8H, structural material layer 807 is patterned to form a torsion hinge 808 and torsion hinge support structures 809 and 810. Torsion hinge 808 and torsion hinge support structures 809 and 810 are at least partially embedded in sacrificial layer 803.

Figure 8I:
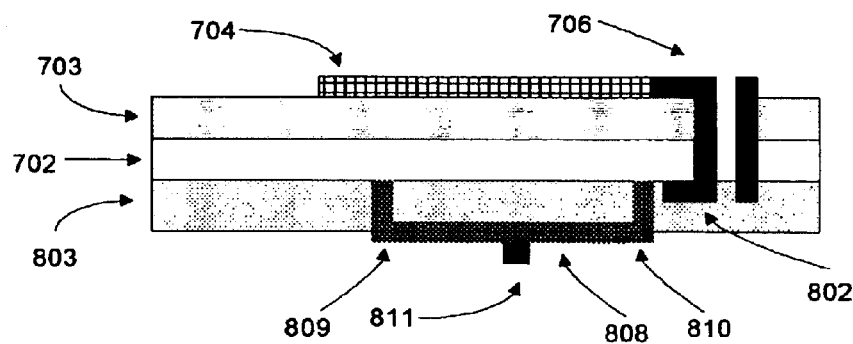
Figure 8J:
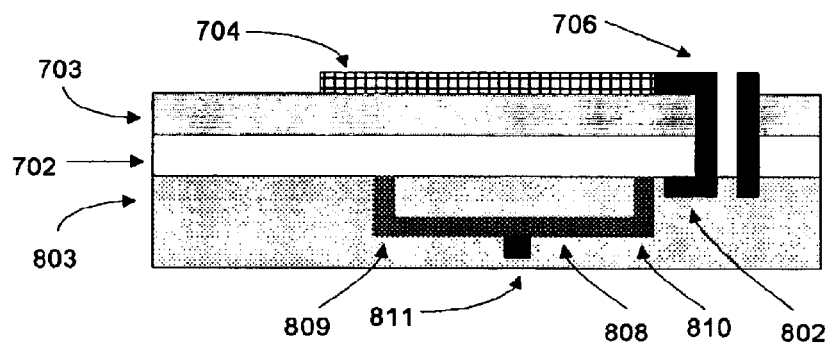
Figure 8K:
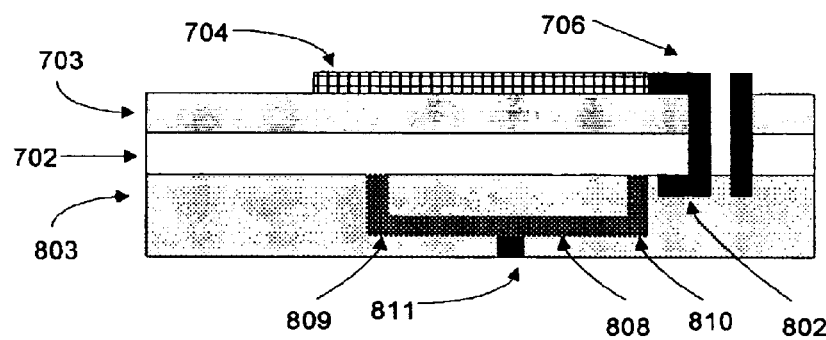

A micromirror support structure is placed between the torsion beam and the micromirror. As shown in FIG. 8I, a metal layer is deposited and then patterned to provide a micromirror support structure 811 on torsion beam 808. The metal may be an Al alloy comprising 0.2% Ti, 1% Si, and the remainder Al. A preferred method of depositing this Al alloy is sputter deposition. Another layer of sacrificial amorphous silicon is deposited (FIG. 8J) such that the micromirror support structure 811 is fully covered by sacrificial layer 803. A chemical mechanical polishing (CMP) process is carried out to planarize the surface such that the following requirements are satisfied:
1) the top of the micromirror support structure 811 is exposed and planar;
2) the sacrificial layer 803 is planar; and
3) the top of the micromirror support structure 811 and the top of the sacrificial layer 803 are at the same level.

In this description, top is understood to mean bottom on the drawing page. The result of the planarization step is shown schematically in FIG. 8K.

Figure 8L:
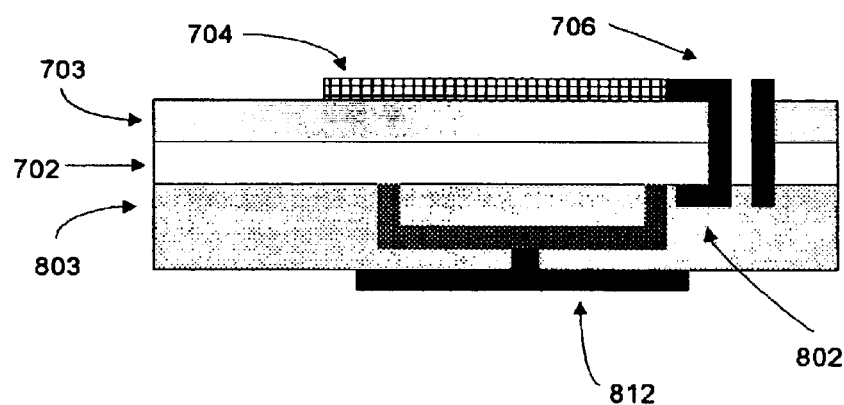
Figure 8M:
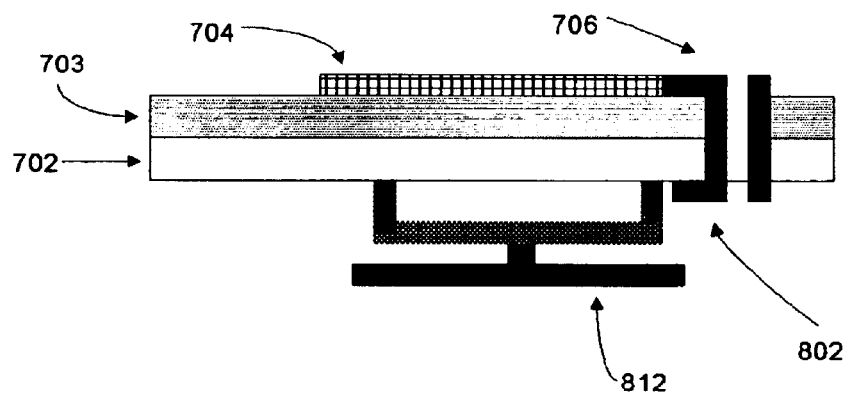

A metallic layer is deposited and patterned to form a micromirror 812 as shown in FIG. 8L. The metal may be an Al alloy comprising 0.2% Ti, 1% Si, and the remainder Al. A preferred method of depositing this Al alloy is sputter deposition. The micromirror 812 is connected to the micromirror support structure 811. A xenon difluoride etch is carried out to remove the amorphous silicon sacrificial layer (FIG. 8M).

In the foregoing discussion the preferred micromirror comprised a metallic coating. However, it is also possible to construct a micromirror out of multiple alternating layers of higher refractive index and lower refractive index dielectrics. This may be accomplished by using silicon oxide and silicon nitride. Therefore, if an Al mirror has a reflectivity of 92%, the reflectivity can be increased to over 95% by first depositing 68nm of silicon nitride (n=2.0) and then depositing 96nm of silicon dioxide (n=1.46).

In the foregoing discussion of FIGS. 8G to 8M, all of the structural members (torsion hinge, torsion hinge support structures, micromirror, micromirror support structures) were metallic. Alternatively, it is possible to use a dielectric (e.g. hardened photoresist, silicon oxide, silicon nitride, silicon oxynitride) that has been covered with a metallic sheath as a structural member, as described more fully in U.S. Pat. No. 5,631,782.

Figure 9:
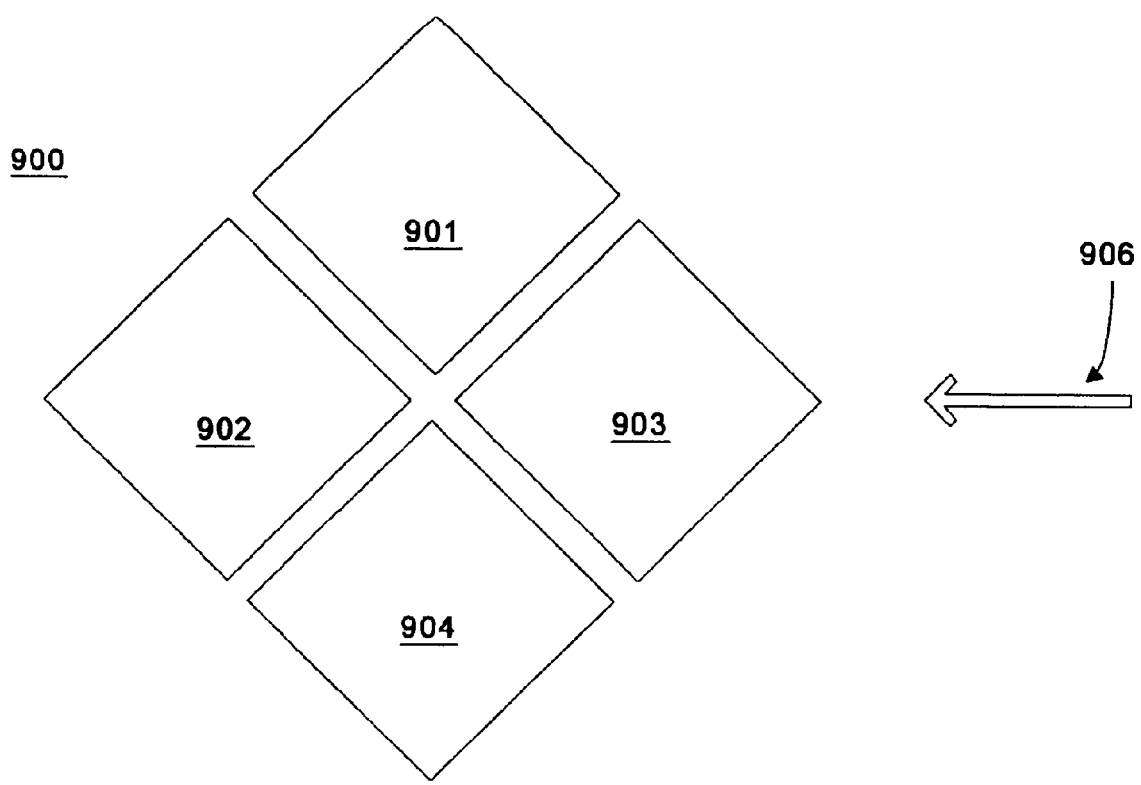
FIG. 9 is a schematic plan view illustrating a micromirror array of rectangular micromirrors according to a 5th embodiment of the present invention.
Figure 10:
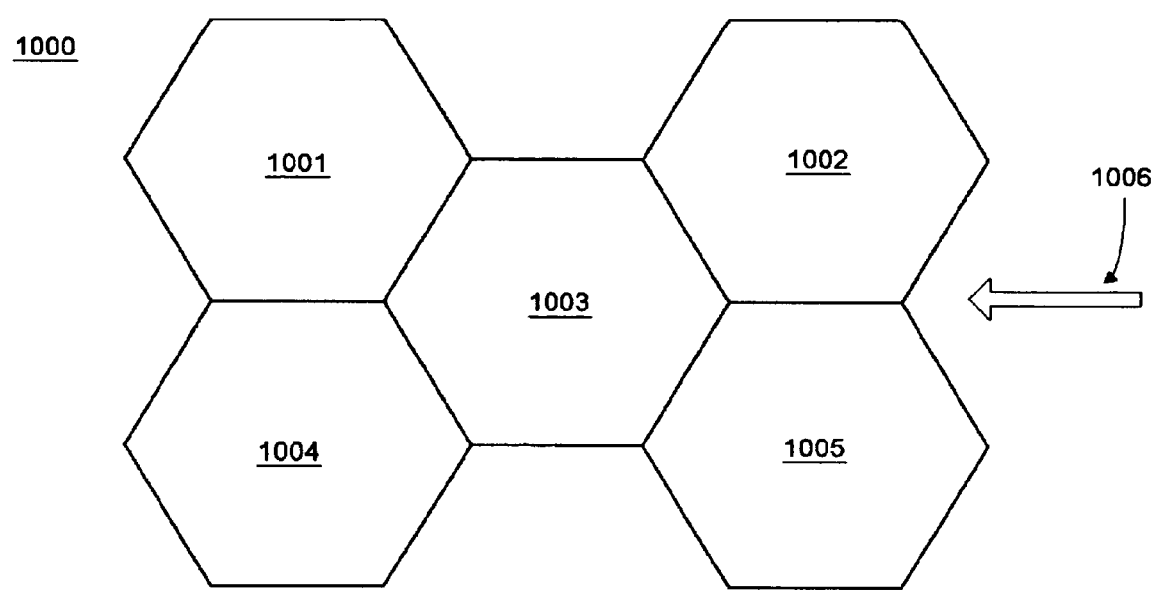
FIG. 10 is a schematic plan view illustrating an array of hexagonal micromirrors in accordance with a 6th embodiment of the present invention.

Typically, micromirror devices are incorporated into an array. FIG. 9 shows a 2-dimensional array 900 of rectangular micromirrors (901, 902, 903, and 904), according to a 5th embodiment of the present invention. Arrow 906 indicates the projection of the incident light propagation vector on the mirror plane (device substrate plane). The reflective side of the micromirror has no edges that are perpendicular to arrow 906. This is a configuration that reduces diffraction into the acceptance cone of the optical system. Another possible shape for a micromirror is a hexagon, shown being disposed in an array 1000 in FIG. 10, according to a 6th embodiment of the present invention. There are micromirrors 1001, 1002, 1003, 1004, and 1005. Arrow 1006 indicates the projection of the incident light propagation vector on the mirror plane (device substrate plane). The reflective side of the micromirrors has no edges that are perpendicular to arrow 1006.

Figure 11A:
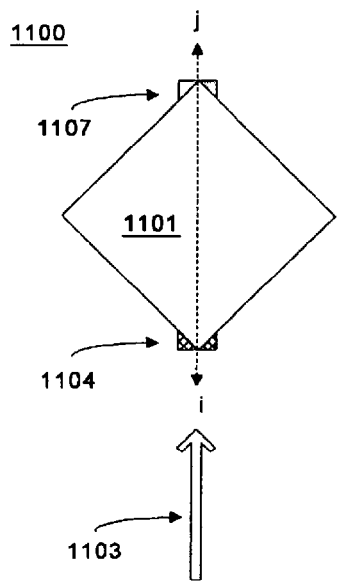
FIG. 11A is a schematic plan view of a micromirror device in accordance with a 7th embodiment of the present invention.
Figure 11B:
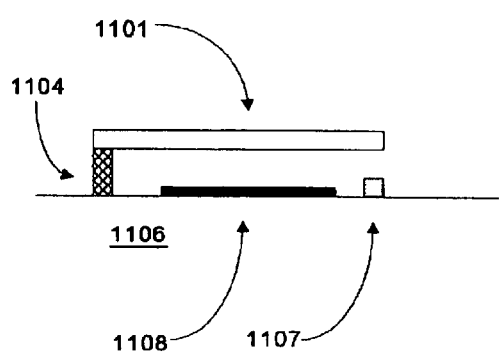
FIG. 11B is a schematic cross sectional view along line i-j of FIG. 11A.

A 7th embodiment of the present invention is explained with reference to FIGS. 11A and 11B. FIG. 11A is a schematic plane view of a micromirror device 1100, comprising a micromirror 1101 and a micromirror support structure 1104. Arrow 1103 indicates the projection of the incident light propagation vector on the micromirror plane (device substrate plane). The reflective side of the micromirror has no edges that are perpendicular to arrow 1103. The reflective side of micromirror 1101 is substantially planar, with neither recessions nor protrusions. FIG. 11B is a schematic cross sectional view along line i-j of FIG. 11A. An addressing electrode 1108 is located under micromirror 1101 and on top of device substrate 1106. Furthermore, a stopper 1107 has been provided. The purpose of stopper 1107 is to prevent micromirror 1101 from contacting addressing electrode 1108 under deflection. This may cause an electrical short. Instead, micromirror 1101 contacts stopper 1107. In cases where a micromirror deflects in 2 directions from its undeflected state, it is possible to provide 2 stoppers with 1 stopper for each direction of deflection.

Figure 11C:
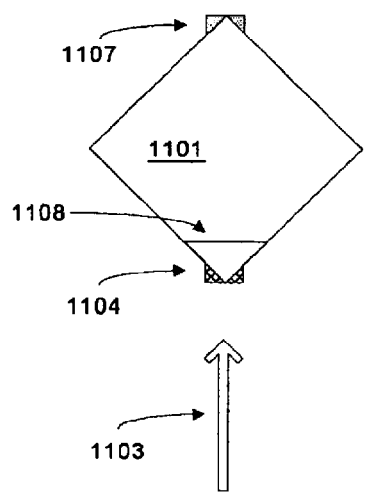
FIG. 11C is a schematic plan view of a micromirror device in accordance with an 8th embodiment of the present invention.

FIG. 11C illustrates a modification to micromirror device 1100 in accordance with an 8th embodiment of the present invention. FIG. 11C is a plan view of a micromirror device 1100 comprising a micromirror 1101, a support structure 1104, and a stopper 1107. In its undeflected state, the reflective side of micromirror 1101 has no edges that are perpendicular to arrow 1103. When the micromirror 1101 is actuated, the region 1108 of micromirror 1101 that is adjacent to support structure 1104 gets deflected. Therefore, an edge that is perpendicular to arrow 1103 may appear in region 1108. In order to reduce diffraction effects from this edge, it is possible to coat region 1108 with a light absorbing material. A preferred light absorbing material is a black dye.

Figure 12A:
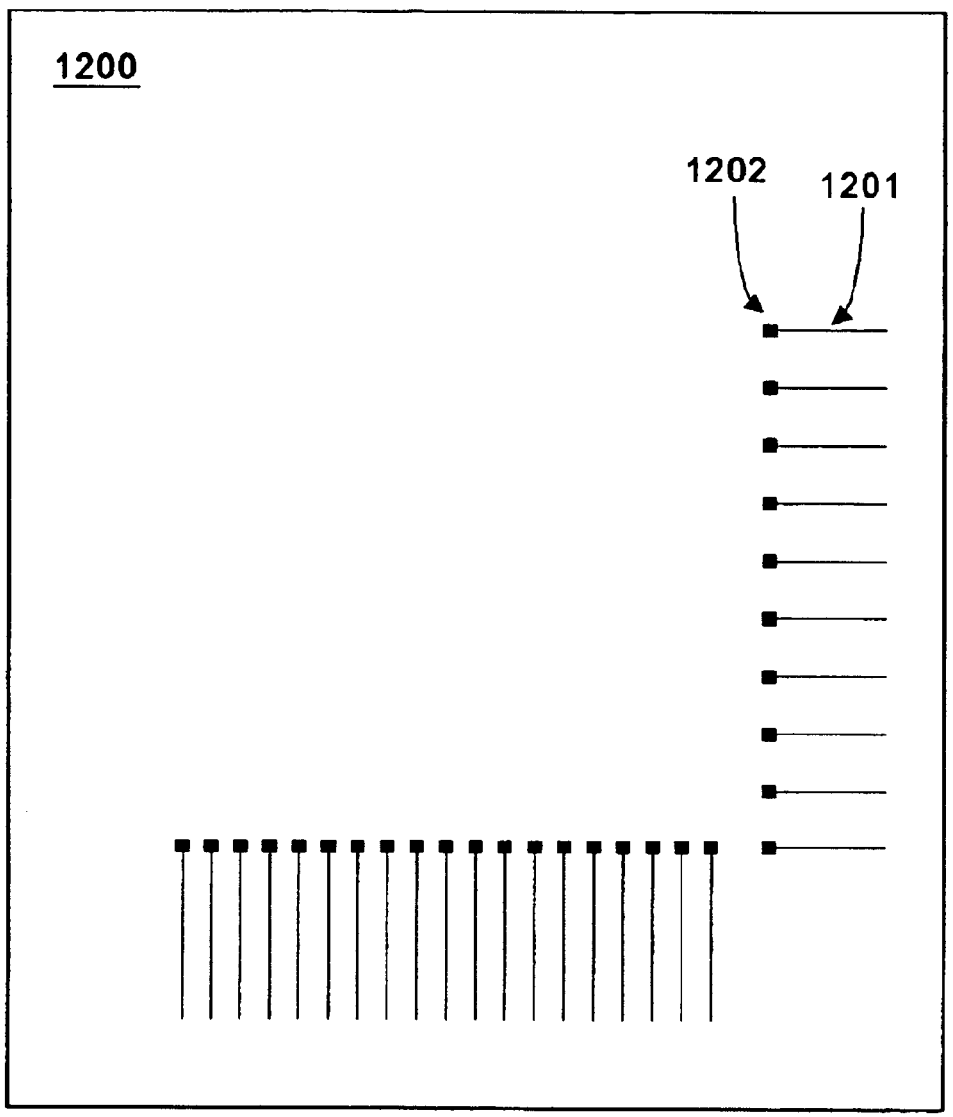
FIG. 12A is a schematic plan view of a 1st packaging substrate in accordance with the present invention.

In a preferred embodiment, a micromirror array is packaged in a vacuum package and electrical connections are formed by flip chip assembly. An insulating substrate such as glass or ceramic is provided as shown in FIG. 12A. FIG. 12A is a schematic plan view of a 1st packaging substrate 1200. Substrate 1200 has a plurality of metallic terminals 1202 and a plurality of lead wires 1201, such that the terminals 1202 are configured to mate with the metallic terminals of the control circuitry of the micromirror array. The device wafer that contains the micromirror array is singulated. A micromirror array chip is aligned with the 1st packaging substrate and mounted by flip chip assembly.

Figure 12B:
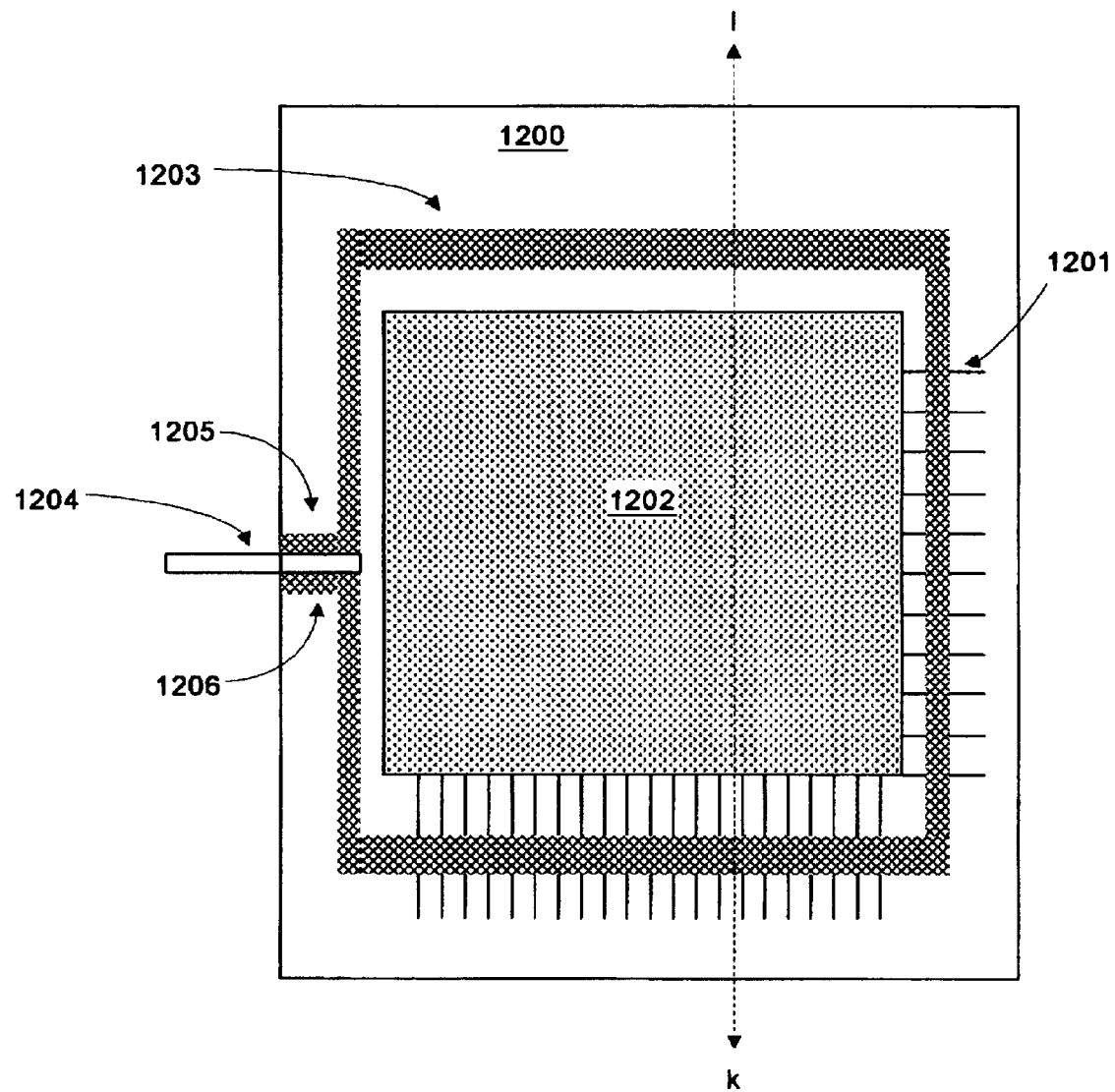
FIG. 12B is a schematic plan view illustrating a step in a fabrication process of a vacuum packaged micromirror array in accordance with the present invention.

FIG. 12B shows a schematic plan view of the 1st packaging substrate 1200 after the micromirror array chip has been mounted and a glass frit composition has been coated around the array. Micromirror array chip 1202 is mounted with the control circuitry side facing the 1st packaging substrate and the micromirror side facing the reader. A glass frit composition is coated at the bonding line 1203 that surrounds the micromirror chip array 1202. Portions of lead wires 1201 are located outside the bonding line 1203. An evacuation tube 1204 is provided and a glass frit bonding line is formed around it (1205 and 1206).

Portions of lead wires 1201 are located outside the bonding line 1203. It is preferable to use Dumet to form the lead wires 1201 in order to form a leak-tight reliable seal. Dumet is an alloy that is substantially approximately 42% nickel and 58% iron, but with the allowance that there may often be about 1% or less of a combination of various elements such as silicon, carbon, and magnesium. Dumet has a relatively high coefficient of thermal expansion (about $90 \times 10^{-7}/°$ C.). The surface of the Dumet wire may be deliberately oxidized to improve the adhesion to the glass frit.

Figure 12C:
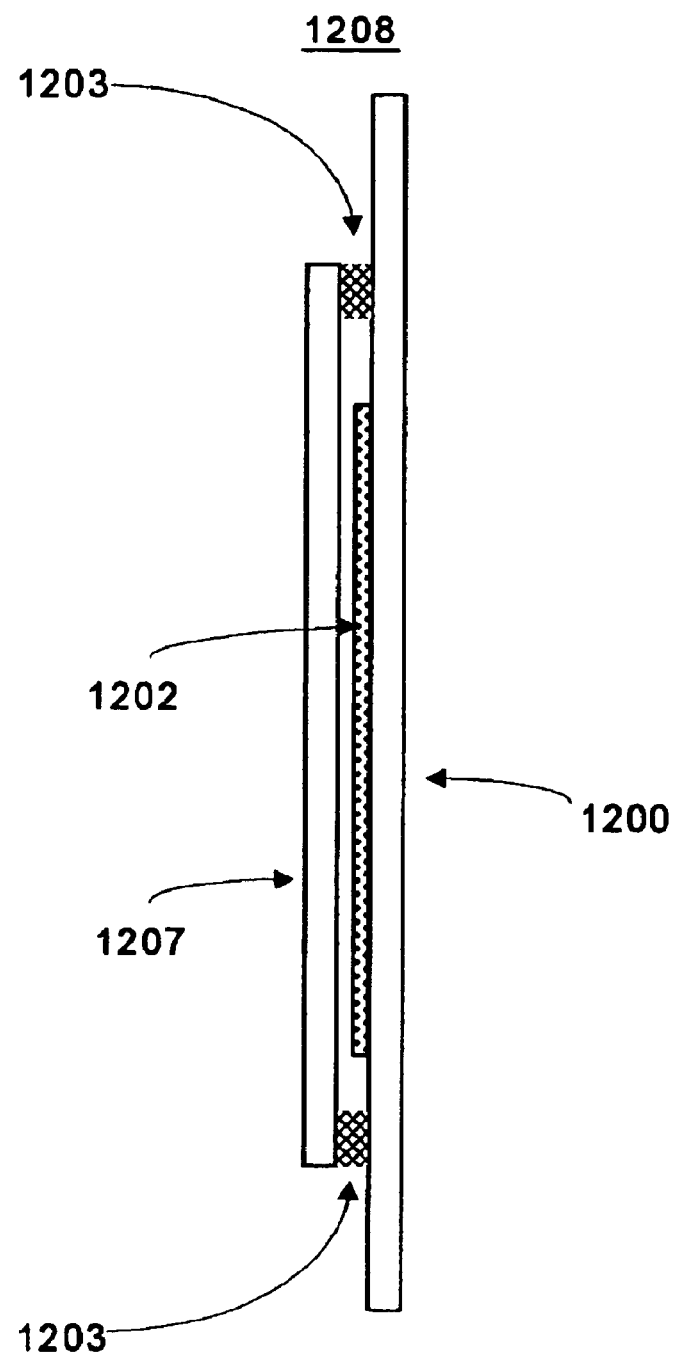
FIG. 12C is a schematic cross sectional view of a vacuum packaged micromirror in accordance with the present invention.

FIG. 12C is a schematic cross sectional view of an assembled package 1208 along line k-l of FIG. 12B. A 2nd packaging substrate 1207 (lid substrate) is provided to assemble the package. In FIG. 12B, the micromirrors are facing toward the reader (out of the page). Therefore, the 2nd packaging substrate 1207 (lid substrate) should be transparent to electromagnetic radiation, and could preferably be glass, quartz, or sapphire. If the micromirror array is to be used to modulate infrared light, it may be acceptable to use silicon as the 2nd packaging substrate.

It is generally preferable to establish a standoff distance between the 2 packaging substrates. This may be accomplished by providing a frame (for example made out of ceramic) and placing the frame at bonding line 1203. The thickness of the frame approximately determines the stand-off distance. Preferably the glass frit composition is coated on both sides of the frame. Alternatively, the stand-off distance may be fixed by coating the glass frit composition, heating the composition to remove the solvent and binder, and planarizing the glass frit coating. Alternatively, the stand-off distance may be established by using a glass frit composition comprising a glass frit and a particular filler material with a melting point higher than that of the glass frit, as described in the Background Art section.

The packaging substrates are assembled and the assembly is heat treated at a temperature that melts the glass frit. The assembly is evacuated and then the evacuation tube is sealed.

The method illustrated in FIG. 12B shows an evacuation tube between the packaging substrates. However, it is also possible to seal the evacuation tube on the 1st packaging substrate. As discussed in the Background Art section, it is also possible to form the vacuum assembly without using an evacuation tube. For example, the assembly may be evacuated before the heat treatment that melts the glass frit seals the bonding line.

It is preferable to obtain a vacuum package where the pressure is less than about $1 \times 10^{-4}$ torr, and it is more preferable to achieve less than about $1 \times 10^{-6}$ torr. It is known to provide a getter material in the interior of a vacuum package to maintain good vacuum during the lifetime of the array. With reference to FIG. 12B, the getter material should be positioned somewhere within the interior of bonding line 1203. However, it may not be preferable to place it in the region between micromirror array 1202 and 2nd packaging substrate (lid substrate) because of primarily 2 reasons: 1) it may block light to or from micromirror array 1202; and 2) when the getter is activated at high temperature, the getter material may sublime and form deposits on the micromirrors or other parts of the array.

In a preferred embodiment, the interior of the region bounded by the bonding line 1203 should be divided into 2 regions: 1) a 1st region occupied by micromirror array chip 1202; and 2) a 2nd region occupied by a getter material. Normally, the 1st region should be substantially bigger than the 2nd region. The 2 regions should be separated by a non-sealing barrier, such that gas diffusion between the regions is allowed.

I claim:

1. A vacuum packaged array of electromechanical micromirror devices comprising:
   a device substrate having a 1st surface and a 2nd surface;
   control circuitry disposed on said 1st surface of said device substrate;
   an array of micromirror sections disposed on said 2nd surface of said device substrate, wherein each said micromirror section comprises:
   a micromirror;
   at least 1 support structure for supporting said micromirror; and
   at least 1 addressing electrode for actuating said micromirror;
   a plurality of electrically conductive routing lines integral with said device substrate that connects said control circuitry to said at least 1 addressing electrode;
   a 1st plurality of metallic terminals disposed on said 1st surface of said device substrate that are electrically connected with said control circuitry;
   a 1st packaging substrate having a 1st surface and a 2nd surface;
   a 2nd plurality of metallic terminals disposed on said 1st surface of said 1st packaging substrate;
   a plurality of solder balls electrically connecting said 1st plurality of metallic terminals to said 2nd plurality of metallic terminals and thereby mounting said device substrate on said 1st packaging substrate;
   a 2nd packaging substrate being adhered to said 1st surface of said 1st packaging substrate by a glass frit bonding line that surrounds said device substrate; and
   an evacuated region bounded by said packaging substrates and said glass frit bonding line.

2. The vacuum packaged array of claim 1, wherein said control circuitry is selected from the group consisting of: CMOS circuits, NMOS circuits, PMOS circuits, bipolar transistor circuits, BiCMOS circuits, DMOS circuits, HEMT circuits, amorphous silicon thin film transistor circuits, polysilicon thin film transistor circuits, SiGe transistor circuits, SiC transistor circuits, GaN transistor circuits, GaAs transistor circuits, InP transistor circuits, CdSe transistor circuits, organic transistor circuits, and conjugated polymer transistors circuits.

3. The vacuum packaged array of claim 1, wherein said device substrate is selected from the group consisting of silicon-on-insulator (SOI), silicon, polycrystalline silicon, glass, plastic, ceramic, germanium, SiGe, SiC, sapphire, quartz, GaAs, and InP.

4. The vacuum packaged array of claim 1, wherein said electrically conductive routing lines between said control circuitry and said at least 1 addressing electrode comprises at least 1 via through said device substrate and a metallization in said at least 1 via.

5. The vacuum packaged array of claim 1, wherein said device substrate additionally comprises an insulating layer between said 1st surface and said 2nd surface.

6. The vacuum packaged array of claim 1, wherein said micromirror is a metallic mirror.

7. The vacuum packaged array of claim 1, wherein said micromirror is a multilayer dielectric mirror.

8. The device of claim 1, wherein the reflective side of said micromirror is substantially planar with neither recesses nor protrusions.

9. The vacuum packaged array of claim 1, wherein said micromirror has no edges that are perpendicular to the projection of the incident light propagation vector onto the plane of said device substrate.

10. The vacuum packaged array of claim 9, wherein said micromirror is in the shape of a polygon.

11. The vacuum packaged array of claim 10, wherein said polygon is selected from the group consisting of a rectangle and a hexagon.

12. The vacuum packaged array of claim 1, wherein said micromirror section additionally comprises:
   a torsion hinge that is disposed to support said micromirror support structure; and a pair of support structures for said torsion hinge that supports said torsion hinge on said substrate.

13. The vacuum packaged array of claim 1, wherein said micromirror section additionally comprises at least 1 stopping member that limits the rotation of said micromirror.

14. The vacuum packaged array of claim 13, wherein said at least 1 stopping member comprises:
   a 1st stopping member that limits the rotation of said micromirror in a 1st direction; and
   a 2nd stopping member that limits the rotation of said micromirror in a direction opposite to said 1st direction.

15. The vacuum packaged array of claim 1, wherein said 1st packaging substrate is electrically insulating.

16. The vacuum packaged array of claim 15, wherein said 1st packaging substrate is selected from the group consisting of ceramic, glass, quartz, sapphire, plastic, a semiconductor with a dielectric coating, and a metal with a dielectric coating.

17. The vacuum packaged array of claim 1, wherein said 2nd packaging substrate is transparent to electromagnetic radiation.

18. The vacuum packaged array of claim 17, wherein said 2nd packaging substrate is selected from the group consisting of glass, quartz, sapphire, plastic, and semiconductors.

19. The vacuum packaged array of claim 18, wherein said semiconductor is silicon.

20. The vacuum packaged array of claim 1, wherein the glass frit composition that is used to form said glass frit bonding line comprises a glass frit, a solvent, and a binder.

21. The vacuum packaged array of claim 1, wherein the glass frit composition that is used to form said glass frit bonding line comprises a glass frit with a glass transition temperature of less than 400° C.

22. The vacuum packaged array of claim 21, wherein said glass frit has a glass transition temperature of less than 350° C.

23. The vacuum packaged array of claim 22, wherein said glass frit has a glass transition temperature of less than 300° C.

24. The vacuum packaged array of claim 1, wherein the glass frit composition that is used to form said glass frit bonding line comprises a glass frit with a softening temperature of less than 450° C.

25. The vacuum packaged array of claim 24, wherein said glass frit has a softening temperature of less than 400° C.

26. The vacuum packaged array of claim 25, wherein said glass frit has a softening temperature of less than 350° C.

27. The vacuum packaged array of claim 1, wherein the glass frit composition that is used to form said glass frit bonding line comprises a glass frit that contains 45 to 90% PbO by weight.

28. The vacuum packaged array of claim 1, wherein the glass frit composition that is used to form said glass frit bonding line comprises a glass frit and a particulate filler material, said particulate filler material having a melting point higher than that of said glass frit.

29. The vacuum packaged array of claim 1, wherein an evacuation tube is disposed between said packaging substrates.

30. The vacuum packaged array of claim 1, wherein an evacuation tube is sealed on an opening in said 2nd surface of said 1st packaging substrate.

31. The vacuum packaged array of claim 1, additionally comprising a getter material that is disposed in the interior of said evacuated region.

32. The vacuum packaged array of claim 31, wherein said evacuated region comprises a 1st portion and a 2nd portion and a non-sealing barrier therebetween, wherein said 1st portion contains said device substrate;

said 2nd portion contains said getter material; and said non-sealing barrier allows gas diffusion between said 1st portion and said 2nd portion.

33. The vacuum packaged array of claim 1, wherein said evacuated region has a pressure of less than approximately $1 \times 10^{-4}$ torr (approximately $1.33 \times 10^{-2}$ Pa).

34. The vacuum packaged array of claim 33, wherein said evacuated region has a pressure of less than approximately $1 \times 10^{-6}$ torr (approximately $1.33 \times 10^{-4}$ Pa).

35. A spatial light modulator (SLM) comprising a vacuum packaged array according to claim 1.

36. A method of fabricating a vacuum packaged array of electromechanical micromirror devices, comprising the steps of:

providing a device substrate with a 1st surface and a 2nd surface;

forming control circuitry on said 1st surface of said device substrate;

forming a plurality of micromirror sections on said 2nd surface of said device substrate, comprising the steps of;

forming a plurality of addressing electrodes for actuating micromirrors;

forming a plurality of support structures for supporting said micromirrors; and forming a plurality of micromirrors such that they are supported by said support structures; and forming a plurality of electrically conductive routing lines that are integral with said device substrate that connects said control circuitry to said at least 1 addressing electrode;

forming a 1st plurality of metallic terminals disposed on said 1st surface of said device substrate that are electrically connected with said control circuitry; providing a 1st packaging substrate having a 1st surface and a 2nd surface; forming a 2nd plurality of metallic terminals on said 1st surface of said 1st packaging substrate;

depositing a plurality of solder balls on either of said plurality of metallic terminals;

electrically connecting said 1st plurality of metallic terminals to said 2nd plurality of metallic terminals and thereby mounting said device substrate on said 1st packaging substrate;

providing a 2nd packaging substrate;

adhering said 2nd packaging substrate to said 1st surface of said 1st packaging substrate by sealing at a glass frit bonding line that surrounds said device substrate (package sealing step); and forming an evacuated region bounded by said packaging substrates and said glass frit bonding line (evacuation step).

37. The method of claim 36, wherein said step of forming control circuitry comprises a step of fabricating circuits selected from the group consisting of: CMOS circuits, NMOS circuits, PMOS circuits, bipolar transistor circuits, BiCMOS circuits, DMOS circuits, HEMT circuits, amorphous silicon thin film transistor circuits, polysilicon thin film transistor circuits, SiGe transistor circuits, SiC transistor circuits, GaN transistor circuits, GaAs transistor circuits, InP transistor circuits, CdSe transistor circuits, organic transistor circuits, and conjugated polymer transistor circuits.

38. The method of claim 36, wherein said device substrate is selected from the group consisting of silicon-on-insulator (SOI), silicon, polycrystalline silicon, glass, plastic, ceramic, germanium, SiGe, SiC, sapphire, quartz, GaAs, and InP.

39. The method of claim 36, wherein said step of forming electrically conductive routing lines that connect said control circuitry and said at least 1 addressing electrode comprises the steps of:

forming at least 1 via through said device substrate; and forming a metallization in said at least 1 via.

40. The method of claim 36, wherein said device substrate additionally comprises an insulating layer disposed between said 1st surface and said 2nd surface.

41. The method of claim 36, wherein said step of forming a micromirror comprises a step of forming a reflective metallic coating.

42. The method of claim 36, wherein said step of forming a micromirror comprises a step of forming a reflective multilayer dielectric coating.

43. The method of claim 36, wherein said step of forming micromirror sections comprises the steps of:

forming said plurality of micromirror support structures such that it is embedded in a layer of sacrificial material;

planarizing said sacrificial layer such that said sacrificial layer and the top of said micromirror support structure are substantially planar;

depositing a micromirror material on said planar surface;

patterning said micromirror material to form a plurality of micromirrors; and removing said sacrificial layer by an etching process.

44. The method of claim 36, wherein said sacrificial layer material is selected from the group consisting of photoresist polymer, silicon oxide, silicon nitride, silicon oxynitride, and amorphous silicon.

45. The method of claim 44, wherein said planarizing step comprises a chemical mechanical polishing (CMP) process.

46. The method of claim 36, wherein said step of forming a plurality of micromirrors comprises a step of:

patterning each micromirror such that its reflective surface has no edges that are perpendicular to the projection of the incident light propagation vector onto the plane of said device substrate.

47. The method of claim 36, wherein each said micromirror is patterned to be in the shape of a polygon.

48. The method of claim 47, wherein said polygon is selected from the group consisting of a rectangle and a hexagon.

49. The method of claim 36, additionally comprising a step of forming a torsion hinge for supporting each said micromirror support structure, said step comprising:

forming a plurality of support structures for supporting torsion hinges; and forming a plurality of torsion hinges.

50. The method of claim 36, additionally comprising a step of: forming at least 1 stopping member that limits the rotation of each said micromirror.

51. The method of claim 50, wherein said step of forming at least 1 stopping member comprises:

forming a 1st stopping member that limits the rotation of each said micromirror in a 1st direction; and forming a 2nd stopping member that limits the rotation of each said micromirror in a direction opposite to said 1st direction.

52. The method of claim 36, wherein said 1st packaging substrate is electrically insulating.

53. The method of claim 52, wherein said 1st packaging substrate is selected from the group consisting of ceramic, glass, quartz, sapphire, plastic, a semiconductor with a dielectric coating, and a metal with a dielectric coating.

54. The method of claim 36, wherein said 2nd packaging substrate is transparent to electromagnetic radiation.

55. The method of claim 54, wherein said 2nd packaging substrate is selected from the group consisting of glass, quartz, sapphire, plastic, and semiconductors.

56. The method of claim 55, wherein said semiconductor is silicon.

57. The method of claim 36, wherein the glass frit composition that is used to form said glass frit bonding line comprises a glass frit, a solvent, and a binder.

58. The method of claim 36, wherein the glass frit composition that is used to form said glass frit bonding line comprises a glass frit with a glass transition temperature of less than 400° C.

59. The method of claim 58, wherein said glass frit has a glass transition temperature of less than 350° C.

60. The method of claim 59, wherein said glass frit has a glass transition temperature of less than 300° C.

61. The method of claim 36, wherein the glass frit composition that is used to form said glass frit bonding line comprises a glass frit with a softening temperature of less than 450° C.

62. The method of claim 61, wherein said glass frit has a softening temperature of less than 400° C.

63. The method of claim 62, wherein said glass frit has a softening temperature of less than 350° C.

64. The method of claim 36, wherein the glass frit composition that is used to form said glass frit bond line comprises a glass frit that contains 45 to 90% PbO by weight.

65. The method of claim 36, wherein the glass frit composition that is used to form said glass frit bonding line comprises a glass frit and a particulate filler material, said particulate filler material having a melting point higher than that of said glass frit.

66. The method of claim 36, additionally comprising the step of: providing an evacuation tube;

positioning said evacuation tube such that a portion of said evacuation tube is located in the interior of the region bounded by said packaging substrates and glass frit bonding line;

adhering said packaging substrates at said glass frit bonding line; evacuating said package through said evacuation tube after said package sealing step; and sealing said evacuation tube.

67. The method of claim 36, additionally comprising the steps of: providing an evacuation tube;

sealing said evacuation tube on an opening in said 2nd surface of said 1st packaging substrate;

evacuating said package through said evacuation tube after said package sealing step; and sealing said evacuation tube.

68. The method of claim 36, additionally comprising the steps of:

providing a getter material;

positioning said getter material within the interior of the region bounded by said packaging substrates and glass frit bonding line before said package sealing step; and activating said getter after said evacuation step.

69. The method of claim 36, additionally comprising the steps of:

providing a 1st region within the the interior of the region bounded by said packaging substrates and glass frit bonding line, said 1st region containing said device substrate;

providing a 2nd region within the the interior of the region bounded by said packaging substrates and glass frit bonding line;

providing a non-sealing barrier between said 1st region and said 2nd region;

providing a getter material;

positioning said getter material in said 2nd region before said package sealing step; and activating said getter after said evacuation step.

* * * * *